US012696370B2

(12) United States Patent
Siewert et al.

(10) Patent No.: US 12,696,370 B2
(45) Date of Patent: Jul. 28, 2026

(54) PLASMA ARC TORCH WITH FOCUS HOLE ALIGNMENT

(71) Applicant: LINDE GMBH, Pullach (DE)

(72) Inventors: Erwan Siewert, Pullach (DE); Nakhleh A. Hussary, Pullach (DE); Richard Andreas Wagner, Pullach (DE)

(73) Assignee: Linde GmbH, Pullach (DE)

( * ) Notice: Subject to any disclaimer, the term of this patent is extended or adjusted under 35 U.S.C. 154(b) by 1114 days.

(21) Appl. No.: 17/755,913

(22) PCT Filed: Nov. 5, 2020

(86) PCT No.: PCT/EP2020/025492

§ 371 (c)(1),
(2) Date: May 11, 2022

(87) PCT Pub. No.: WO2021/093987

PCT Pub. Date: May 20, 2021

(65) Prior Publication Data

US 2022/0386444 A1 Dec. 1, 2022

(30) Foreign Application Priority Data

Nov. 11, 2019 (EP) .................................... 19020625

(51) Int. Cl.
*H05H 1/34* (2006.01)

(52) U.S. Cl.
CPC ........ *H05H 1/3405* (2013.01); *H05H 1/3423* (2021.05)

(58) Field of Classification Search
CPC ....... H05H 1/34; H05H 1/3405; H05H 1/3423
See application file for complete search history.

(56) References Cited

U.S. PATENT DOCUMENTS 5,874,707 A * 2/1999 Iida ...................... H05H 1/3423 219/121.36
8,395,076 B2 3/2013 Matus
(Continued)

FOREIGN PATENT DOCUMENTS

DE 4407913 A1 * 10/1994 ............... H05H 1/34
EP 0801882 A1 10/1997
(Continued)

*Primary Examiner* — Steven W Crabb
*Assistant Examiner* — Dilnessa B Belay
(74) *Attorney, Agent, or Firm* — Millen, White, Zelano & Branigan, P.C.; Brion P. Heaney

(57) ABSTRACT

A consumables holder assembly for a plasma arc torch having a torch head, the consumables holder assembly comprising a main body, a shielding cup which engages to the main body, a connection means which engages the main body to the torch head, wherein the consumable components including an electrode, a nozzle, a plasma gas distributor, a shielding gas distributor which are all positioned inside the shielding cup, wherein the consumable holder assembly can be detached from the torch head together with the consumable components and the shielding cup as one unit, wherein the nozzle comprises two focus gas passageways which lead a focus gas out of the nozzle through at least two focus holes, wherein external visual features are provided on both connection means and the torch head which are aligned to each other showing the location of the focus holes.

18 Claims, 6 Drawing Sheets

(56) References Cited

U.S. PATENT DOCUMENTS

Figure 1:
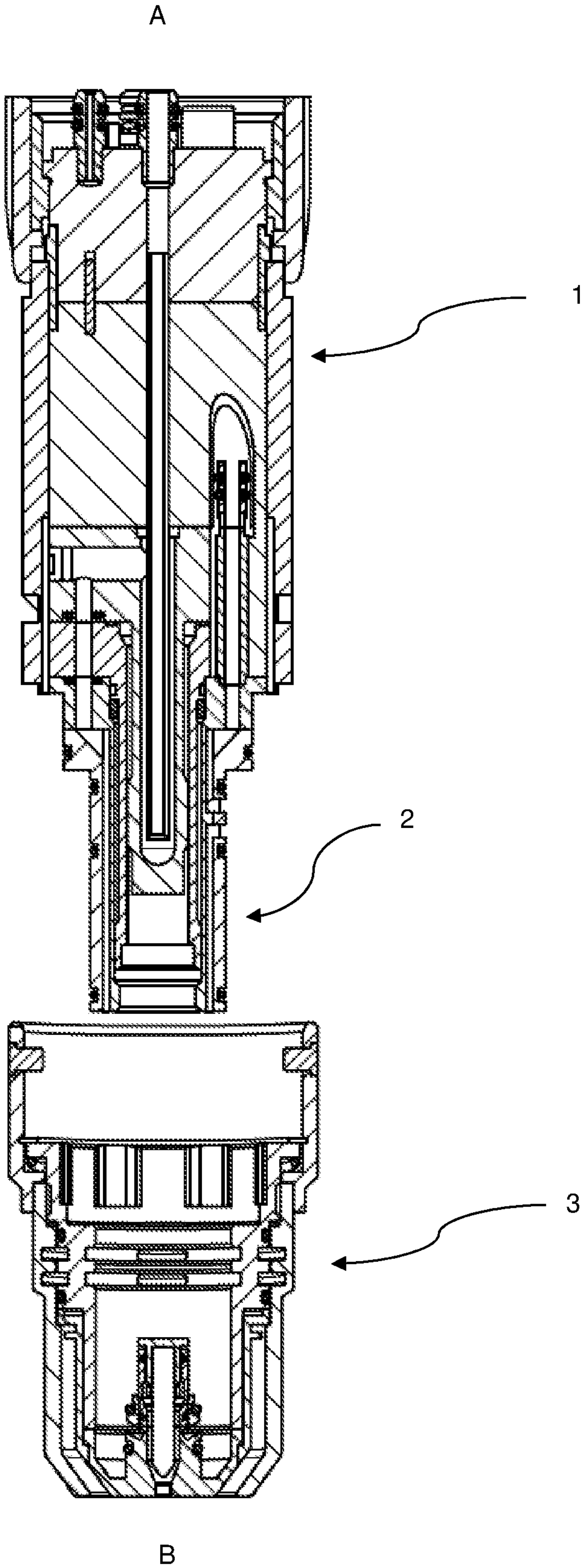

| | | | | |
|---|---|---|---|---|
| 2016/0165711 | A1* | 6/2016 | Zhang | H05H 1/34<br>219/121.52 |
| 2017/0042013 | A1 | 2/2017 | Sanders et al. | |

FOREIGN PATENT DOCUMENTS

| | | | | |
|---|---|---|---|---|
| EP | 2293655 | A1 * | 3/2011 | H05H 1/3423 |
| JP | H05 53780 | U | 7/1993 | |
| WO | 03/089183 | A1 | 10/2003 | |

* cited by examiner

PLASMA ARC TORCH WITH FOCUS HOLE ALIGNMENT

The invention relates to a plasma arc torch with a cartridge holder assembly having a focus hole alignment. The plasma arc torch which is also known as plasma arc, plasma gun or plasma cutter which is a device for generating a directed flow of plasma. The high energy plasma jet is generated by ionization of plasma gases and is directed via the plasma torch to a workpiece to be treated. The plasma jet can be used for applications including plasma arc welding, plasma spraying and plasma gasification for waste disposal. Thermal plasmas are generated in plasma torches by direct current, alternating current, radio-frequency and other discharges.

The plasma arc welding (PAW) process which is carried out by the plasma arc torch is similar to the gas tungsten arc welding (GTAW). The difference from GTAW is that in PAW, by positioning the electrode within the body of the torch, the plasma arc can be separated from the shielding gas envelope. The plasma is then forced through a nozzle which constricts the arc and plasma exits the orifice at high velocities which approaches the speed of sound and a temperature approaching 28000° C. or higher.

A typical plasma arc torch comprises a torch main body, an electrode and a nozzle at the distal end of the torch. The torch main body comprises an anode element which has electrical communication with the positive side of a power supply, and a cathode element that has electrical communication with the negative side of the power supply. The torch main body further comprises coolant supply tube, plasma gas supply tube, shielding gas supply tube and focus gas supply by which the coolant and gas are directed to the distal end of the torch, where the electrode and nozzle are positioned. The electrode carries negative potential and operates as a cathode, whereas the nozzle constitutes a positive potential and operates as an anode. In operation, the plasma gas will be delivered from the proximal end of the torch to the chamber formed between the electrode and the nozzle. The plasma gas is ionized in the chamber and results in a pilot arc. As the torch is moved to a position close to the workpiece, the arc jumps from the torch nozzle to the workpiece to form an electric arc between the electrode and the workpiece. Accordingly, the workpiece serves as the anode and the plasma arc torch is operated in a transferred arc mode.

The energy of the plasma jet and thus the temperature is dependent upon the electrical power employed to create arc plasma. A typical value of the temperature obtained in a plasma arc torch may be of the order of 28000° C. against about 5500° C. in ordinary electric welding arc. Due to the high temperature torch components must be properly cooled in order to prevent damage or malfunction to increase the operating life and maintain the accuracy of the operation.

The plasma arc torch is operated with high current levels and high temperature under which the components of the torch, especially the electrode and nozzle, will be damaged or weared after a certain period of operation even with the cooling. Therefore, these components, which are commonly known as consumable components, need to be replaced frequently. The replacement of the consumable components requires an alignment of high concentricity to ensure the welding accuracy. Hence, every replacement of the components must fulfill the requirement of the concentricity over the life of the plasma arc torch. Furthermore, if focus gas is used it has to be ensured that the orientation of the focus holes is perpendicular to the welding direction. Today this process is time intensive and prone to errors.

However, the existing systems available on the market are difficult to use and difficult to assemble and present a steep learning curve for the operator. Existing system are strongly dependent on the operator and whether the arc torch is assembled correctly or not. The results of the torch performance changes from one consumable set to another set if the replacement is not carefully checked and verified by a qualified welder.

The present invention provides a consumables holder assembly for a plasma arc torch according to the claim 1.

The plasma arc torch comprises a torch main body having a torch head and the consumables holder assembly in the distal direction of the torch. The consumables holder assembly comprises a main body, a shielding cup which engages the main body to hold the consumable components within the space formed between the cup and the main body. Further, the assembly comprises at least one consumable component selected from an electrode, a nozzle, a plasma gas distributor (PGD), a shielding gas distributor (SGD) which are all placed inside the shielding cup.

The torch main body is in connection with a power supply. It comprises an anode element which is in electrical communication with the positive side of a power supply, and a cathode element that is electrical communication with the negative side of the power supply. The torch main body further comprises a coolant supply tube, plasma gas supply tube, shielding gas supply tube and focus gas supply tube by which the coolant and gas are directed to the distal end of the torch, where the electrode and nozzle are positioned.

The electrode carries negative potential and operates as a cathode, whereas the nozzle constitutes a positive potential and operates as an anode. The nozzle comprises a central exit orifice by which the plasma arc is constricted and then exits out of the torch towards the workpiece to be treated. The nozzle is electrically isolated from the electrode by the plasma gas distributor. There is an arc chamber formed between the electrode and the nozzle in which the plasma gas is ionized.

The nozzle comprises at least two focus gas passageways which extend axially to the distal end of the torch to lead a focus gas from the proximal end to outside of the torch via two focus gas holes. The focus gas is used for injection on two sides of the arc. It influences the shape of the arc and changes it from a circular/symmetric arc to oval shape by cooling the fringes of the arc. In doing so, the focus gas also decreases the arc pressure. These two focus holes are preferably positioned perpendicular to the welding direction in operation which helps to further shape the arc in a desirable way. In addition, external visual features are preferably provided on the outside of the torch and the consumables holder assembly indicating the orientation of the focus holes so that the operator can easily recognize the position of the arc torch. By doing so, it is not necessary for the operator to look down at the focus hole to determine the orientation of the arc torch in respect of the travelling direction of welding. It makes the replacement of the consumables holder assembly easier and more efficient. The invention ensures total rotational alignment starting from the focus holes in the nozzle to the part of the torch that is fixed.

The distal direction refers to the axial direction along the arc torch from the torch head towards the nozzle and the proximal direction refers to an axial direction along the arc troch from the nozzle to the torch head.

Preferably, the external visual feature could be outfitted with eye safe laser for aligning the torch with the welding direction. The laser device may be permanently placed there or maybe removable. The laser light may project a longitudinal line along the welding direction and/or a light imprint of varied forms to indicate in aid for initial torch setup and alignment.

Preferably, there are three alignments between the torch head, main body and the connection means.

The connection means is preferably aligned with the torch by a bayonet mount to ensure that the focus holes are properly located. The connection means comprises at least two pins which correspond to the grooves situated in the torch head. The consumables holder assembly attaches to the torch head via the bayonet mount which prevents a rotational movement between the whole consumables holder assembly and the torch head, and thus ensure a high concentric alignment therebetween. Consequently, all the supplies for coolant, plasma gas, focus gas and shielding gas in the torch main body and the consumable holder assembly can be accurately aligned to allow fluid connection from the proximal end to the distal end of the arc torch.

The connection means is preferably aligned with the main body by multiple locking pins which prevents a rotation between the connection means and the main body when they are engaged to ensure focus holes are in the proper orientation.

The main body is preferably aligned with the nozzle by at least one main body pin which is positioned in the distal end of the main body. More preferably, there are two main body pins sitting opposite to each other at the distal end of the main body which correspond to the recesses in the nozzle. The nozzle is assembled to the main body by inserting these two pins into the corresponding recesses of the nozzle and thus prevent any rotation between the nozzle and the main body.

In use of these three alignments, it ensures that for every replacement of the consumables holder assembly, the supply of the cooling medium, shielding gas, plasma gas and focus gas are accurately aligned with the torch head without any complicated assembly and without careful check by a qualified operator.

Preferably, the plasma gas distributor is cylinder-shaped and comprises multiple circumferential holes about its axis through which the plasma gas goes through. The electrode is preferably stick-shaped without any hollow spaces or holes therein and preferably made of tungsten.

The shielding gas distributor (SGD) is cup-shaped and preferably made of plastic and metallic material as like polyether ether ketone (PEEK) and brass or copper. Any other thermosoftening plastic are also possible. The proximal plastic part of the SGD ensures the insulation of the shielding cup to the electrical signals within the torch and the distal metallic part of the SGD with high heat resistance prevent the SGD from being damaged easily by the high temperature of the arc and thus prolong the lifetime of the shielding gas distributor. The shielding gas distributor delivers shielding gas via the gap between the shielding cup and the shielding gas distributor to provide shielding of the weld pool.

The shielding gas cup holds all the consumable components inside and is engaged to the main body by connection means as like thread means.

In operation, a direct current power source having a current up to 550 amps is preferably applied. The shielding gas is delivered from the shielding gas supply at the proximal end of the torch to the distal end of the torch via the gas shielding distributor to prevent the weld pools from contacting the atmosphere and thus provide a shielding environment. The plasma gas is delivered from plasma gas supply at the proximal end of the torch via the plasma gas distributer to the arc chamber. The plasma gas is ionized in the arc chamber and results in a pilot arc. As the torch is moved to a position close to the workpiece, the arc jumps from the torch nozzle to the workpiece to form an electric arc between the electrode and the workpiece. The arc is constricted with the help of the small diameter nozzle which squeezes the arc, increases its pressure, temperature and heat intensely. Accordingly, the workpiece serves as the anode and the plasma arc torch is operated in a transferred arc mode. A non-transferred arc process with the present invention is also possible.

The electrode, PGD, nozzle and SGD are preferably assembled by a drop-in mount with the different geometry of these components. Preferably, the stick-shaped electrode comes through the ring-shaped PGD, wherein the electrode comprises a bottom seat at its proximal end which is preferably made of copper. The seat encloses the bottom of the electrode and prevent the PGD from falling out when it is assembled with the electrode. These two parts drop into the nozzle which holds them in position and forms the arc chamber with the electrode. The assembled parts are then attached to the main body and then placed inside the SGD. Preferably, the SGD have an indirect contact with the main body via an O-ring. Preferably, all these parts are assembled only by their different geometric diameters fitting in with each other without any fixing or locking means as like thread. The parts are then attached onto the main body by a connection means as like thread or bayonet mount. Finally, the shielding cup is screwed onto the proximal portion of the main body.

This assembled part, which is also the consumables holder assembly, can be attached to or detached from the torch head as one unit so that this unit can be replaced as a whole. A such designed consumables holder assembly eases the process of replacement of the consumable components which ensures a good repeatability of the assembly and welding outcome so that no highly qualified operator or complicated check is necessary.

The orientation of the torch in regard to the welding direction has to be set only once with this invention. Afterwards the described invention ensures that the focus holes are always aligned to the main body. There is no need for visual verification of the focus hole orientation any more. The accuracy is much higher compared to the visual alignment from the backside of the torch.

Preferably, among the mentioned consumable components only the nozzle is in direct connection with the distal portion of the main body.

In one preferred embodiment the main body is made of a metallic material and an insulative material. The metallic material is preferably brass or copper and the insulative material is thermoplastic, preferably polyether ether ketone (PEEK). Advantageously, the metallic material is used in the distal portion of the main body which is in direct connection with the hot nozzle in the operation so as to improve the heat resistance of the main body. The insulative material is used in the proximal end of the main body to prevent the electric communication between the cathodic parts and anodic parts. More preferably, the referred distal portion made of metallic material is ring shaped and amounts 10% to 30% of the axial length of the main body and the proximal portion made of insulative material amounts 70% to 90% of the axial length of the main body.

Preferably, the middle section of the main body comprises at least two circumferential grooves having the same axis, wherein the first groove comprises a first radial passageway and the second groove comprises a second radial passageway which both extend through the main body and allow a fluid communication between the exterior and the interior of the main body. Preferably, there is only one radial passageway on each circular groove. More preferably the two passageways are axially in line with each other.

In addition, an essentially axial groove is provided between the at least two grooves which allows a fluid communication from the first groove to the second groove, especially from the first radial passageway to the second radial passageway. Preferably, the axial groove is positioned in the opposite of the two passageways, which has an angle of 180° to the passageways, so that the cooling fluid can cool the both whole grooves. In operation, a cooling fluid, preferable water, flows from the interior of the main body outwards via the first radial passageway in the first groove and then flows to the second groove via the axial groove and then flows to the interior of the main body via the second radial passageway in the second groove. Preferably, the first and second grooves comprises only one such radial passageway respectively and preferably the main body contains only two such passageways for circulating a cooling fluid. With a such configurated middle section a more efficient cooling effect is achieved with minimal space within the torch which simplifies the torch structure and improves the torch robustness at the same time.

Furthermore, the main body, especially the middle section of the main body, comprises multiple axial passageways for passing the shielding gas from the interior to the exterior of the main body. The shielding gas flows through the main body to the shielding gas distributor and exits at the distal end of the torch via the gap between the shielding gas distributor and the shielding cup.

Preferably, there is no passageway in the main body through which the plasma gas flows and neither electrical power or signals are passed through the main body.

In another preferred embodiment, a compression member, preferably a spring, is provided which exerts a force onto the connection means and enable the connection means keeps moving upward to have its bayonet pins inserted into the corresponding grooves of the torch head. In operation, when the whole consumables holder assembly is attached to the torch main body, the electrode engages the torch head and initiate the contact. The inner component comprising main body 4, electrode 6, PGD 8, nozzle 7, shielding cup and SGD then stay axially in place, while the connection means keeps moving up via the compression member and activating a force on the electrode. Through a proper design the axial movement compresses the spring through a pre-determined distance which results a pre-defined force on the contact area between the electrode and torch head. It ensures the correct contact for both electrical connection and thermal heat transfer from the electrode to the torch main body.

In the plasma arc torch, at least three gas supply tubes are provided for plasma gas, shielding gas and focus gas respectively and at least one supply tube is provided for coolant medium to prevent overheat of the torch. Each gas flow is preferably separately controlled in terms of the gas composition, gas flow etc.

The shielding gas comprises preferably pure argon. The focus gas comprises preferably up to 70 vol. % argon and the rest could be H2, He, O2, N2 or mixture thereof. The plasma gas comprises preferably also up to 70 vol. % argon and the rest could be H2, H2, N2 or mixture thereof. The coolant medium is preferably liquid, more preferably water or glycol.

The present invention will be further discussed with the detailed description and the accompanying drawings.

FIG. 1: A longitudinal section view of a plasma arc torch comprising a torch head and a consumables holder assembly.

Figure 2:
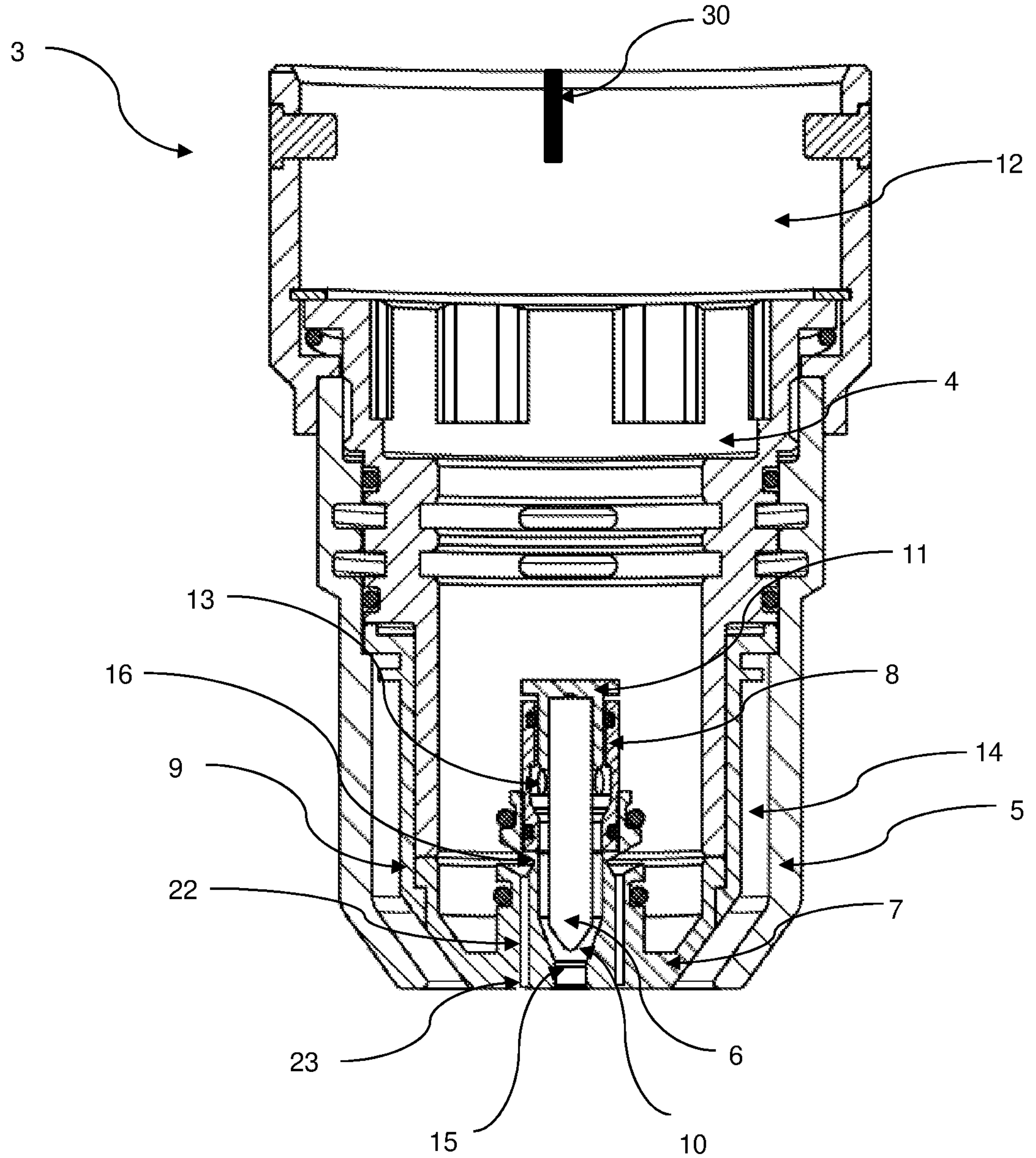

FIG. 2: A longitudinal section view of the consumables holder assembly comprising consumable components.

Figure 3:
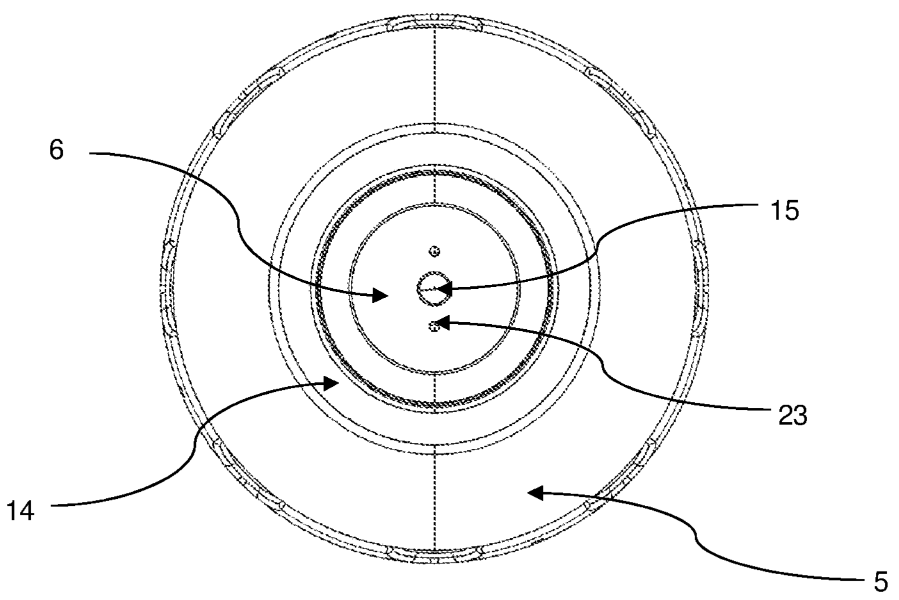

FIG. 3: A plane view of the nozzle comprising focus holes

Figure 4:
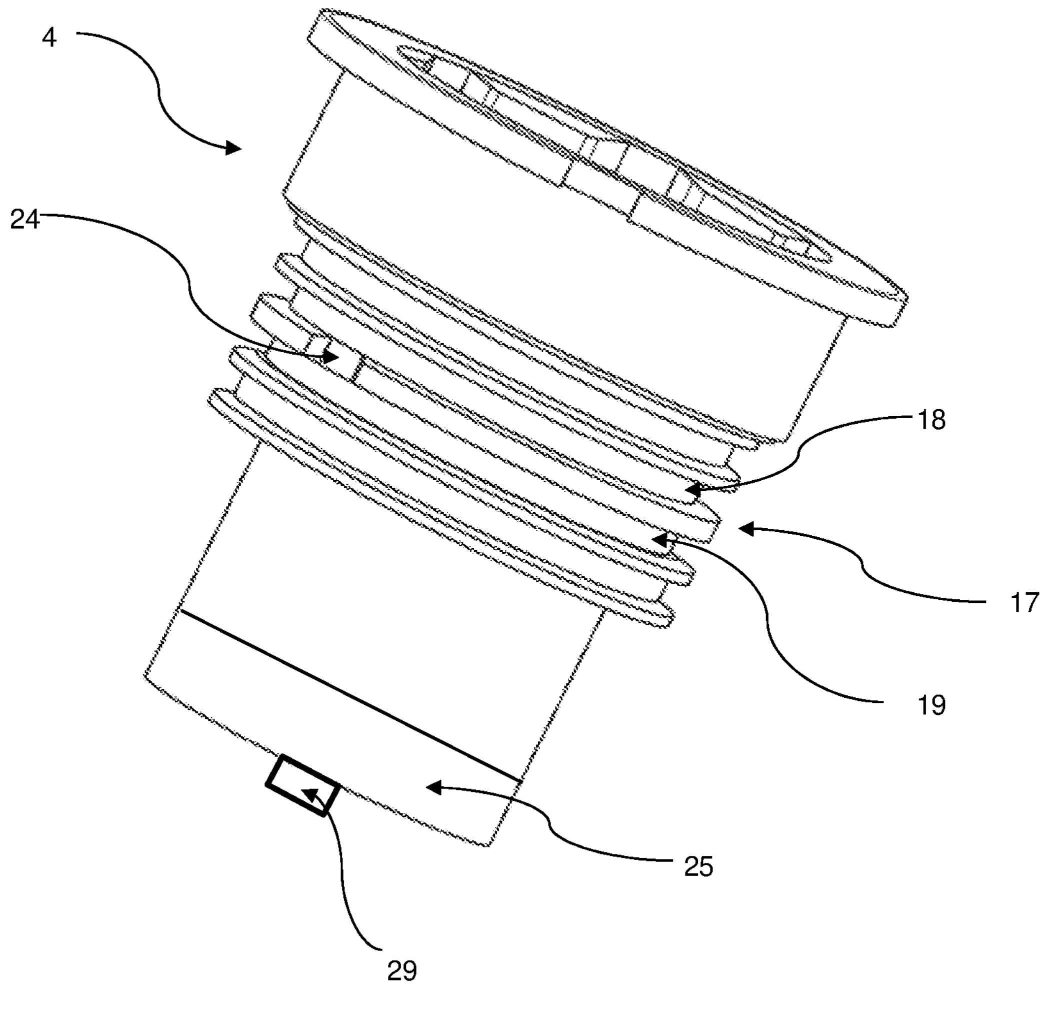

FIG. 4: A perspective view of the main body

Figure 5:
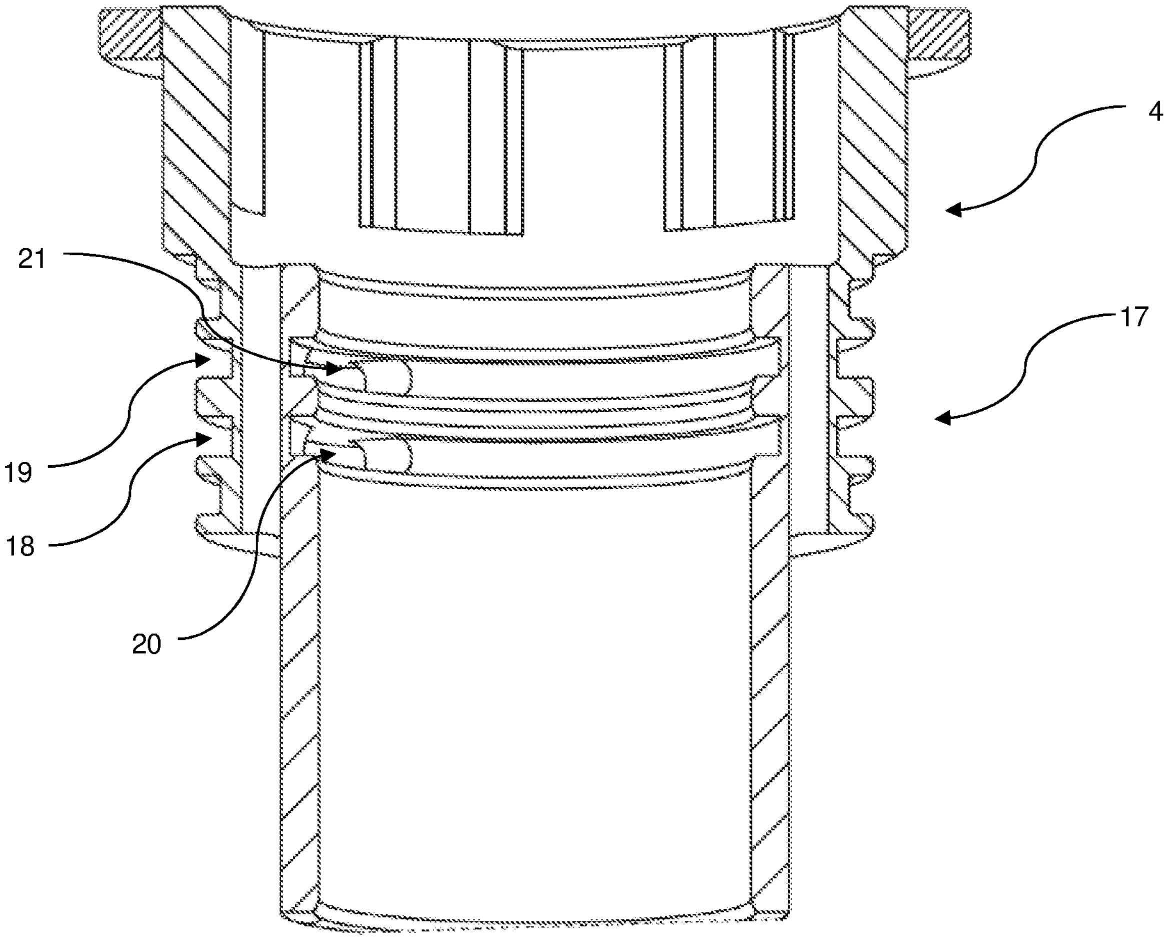

FIG. 5: A longitudinal section view of the main body

Figure 6:
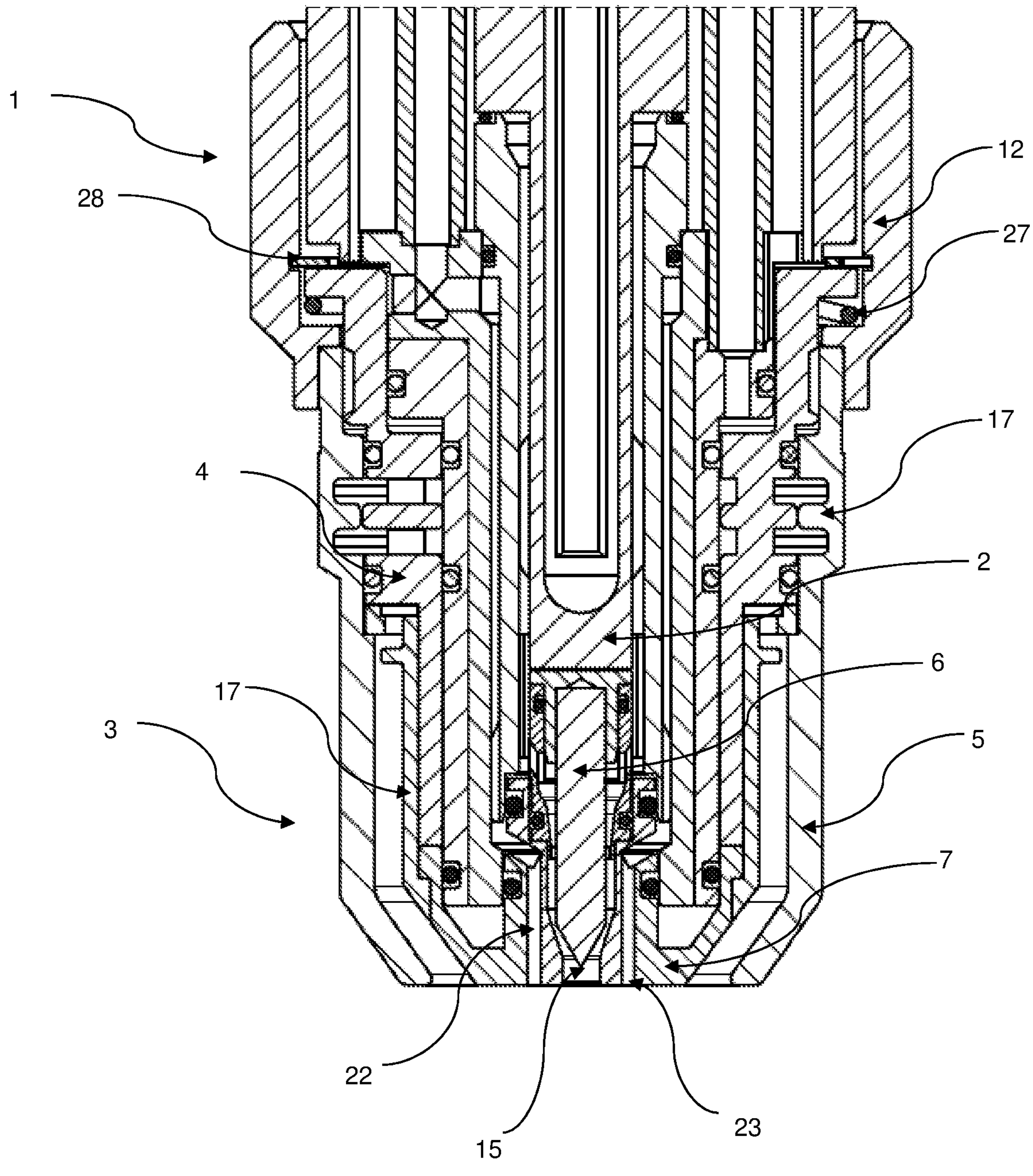

FIG. 6: A longitudinal section view of a plasma arc torch after the torch head is engaged with the consumables holder assembly.

FIG. 1 shows a plasma arc torch which has a torch main body 1 and a consumables holder assembly 3. The torch main body is connected to a power supply and comprises an anode element which is in electrical communication with the positive side of a power supply, and a cathode body that is electrical communication with the negative side of the power supply. The cathode body is insulated from the anode body by an insulative component.

A torch head 2 is provided at the distal end of the torch main body 1 and is further adjoined with a coolant supply tube, a plasma gas supply tube and a shielding gas supply tube. The plasma gas and shielding gas are supplied from the proximal end of the plasma arc torch via the torch head to the consumables holder assembly at the distal end and released to the atmosphere to benefit the welding process, while the coolant is supplied also from the proximal end to the consumables holder assembly and then return back to the proximal end of the plasma arc torch during operation.

The torch main body 1 is engaged with the consumables holder assembly 3 by connection means which ensures an accurate alignment of the supply passageways of the fluid in both torch main body 1 and the consumables holder assembly 3. The consumables holder assembly 3 holds all the consumable components in its housing which needs to be replaced regularly. By such a construction in accordance with the present invention all the consumable components can be attached to or detached from the torch head as one unit. This unit, which is the consumables holder assembly 3, provides a quick and reliable replacement of the consumable components which ensures an accurate alignment of the torch and a good repeatability of the welding outcome.

In addition, the referred proximal and distal are indicated as A and B respectively in FIG. 1.

FIG. 2 shows the consumables holder assembly in detail. The assembly 3 comprises a main body 4, a shielding cup 5, an electrode 6, a nozzle 7, a plasma gas distributor (PGD) 8, a shielding gas distributor (SGD) 9 and connection means 12 having a bayonet mount.

The main body 4 is a cylinder-like shaped component which holds the electrode 6, PGD 8, nozzle 7 within its housing and can be connected and disconnected with the torch head. The main body 4 comprises coolant passageways allowing coolant to flow through and it comprises also shielding gas passageways allowing shielding gas to flow through the main body 4. By "flow through" it means that the coolant or the shielding gas flows from interior to exterior of the main body 4 or vice versa. The main body 4 comprises however no passageway through which the plasma gas flows. Furthermore, there is no electrical power or signals are passed through the main body 4. The main body 4 is made of metallic and plastic material, preferably made of brass and polyether ether ketone.

After the electrode 6 is engaged to the torch head, the electrode 6 carries negative potential and operates as a cathode, whereas the nozzle 7 carries positive potential and operates as an anode. The electrode 6 is stick shaped without hollow space inside and is made of tungsten. There is an arc chamber 10 formed between the electrode 6 and the nozzle 7 in which a pilot arc is generated by ionization of the plasma gas.

The plasma gas is flowed into the arc chamber 10 through the PGD 8 which surrounds the electrode 6. The PGD 8 has multiple circumferential plasma gas holes 13 about its axis through which the plasma gas flows radially inwards into the arc chamber 10. The PGD 8 is assembled with the electrode 6 by sitting on a seat of the electrode 11 which encloses the electrode 6 on its proximal end.

The electrode 6 and the surrounding PGD 8 are engaged to the nozzle 7 by dropping them into the central recess of the nozzle 7. The central recess has a shoulder 16 which has a diameter smaller than it of the PGD 8 but bigger than it of the electrode 6 which holds the PGD 8 sitting on the shoulder and render the electrode 6 go through to form the arc chamber 10. By having these components constituted as such, the anodic nozzle 7 is electrically isolated from the cathodic electrode 6 by the PGD 8. The nozzle 7 further comprises a central exit orifice 15 by which the arc is constricted. In operation, when the torch is moved to a position close to the workpiece to be treated, the pilot arc jumps from the torch nozzle 7 to the workpiece through the orifice 15 which constricts the arc to form a plasma arc between the electrode 6 and the workpiece. Accordingly, the workpiece serves as the anode and the plasma arc torch is operated in a transferred arc mode.

Furthermore, the nozzle 7 comprises two focus gas passageways 22 which extend axially to the distal end of the torch to lead a focus gas from the proximal end to outside of the torch via two focus gas holes 23 as shown in FIG. 3. The focus gas is used for injection on two sides of the arc. It influences the shape of the arc and changes it from a circular/symmetric arc to oval shape by cooling the fringes of the arc. In so doing, the focus gas also decreases the arc pressure. These two focus holes 23 are positioned perpendicular to the welding direction in operation which helps to further shape the arc in a desirable way. In addition, external visual features 30 on the outside of both the torch and the connection means 12 indicating the orientation of the focus holes so that the operator can easily recognize the position of the arc torch. By doing so, it is not necessary for the operator to check the downside of the nozzle 7 every time to determine the correct operation direction of the arc torch.

The SGD 9 is cup-shaped and made of insulative and metallic material, preferably PEEK and brass. The SGD 9 comprises a shoulder at its distal end which holds the nozzle 6 in a drop-in way when they are assembled. Furthermore, the SGD 9 comprises passageways for shielding gas to flow through it. After the shielding gas goes through the SGD 9, it flows into a shielding gas passageway 14 which is formed between the shielding cup 5 and the SGD 9, and then flows out of the torch to provide a shielding atmosphere surrounding the plasma arc which is generated through the exit orifice 15 in the middle.

The shielding cup 5 is the outermost cup which holds all the other consumable components within its internal space. It is engaged on the proximal portion of the main body 4 by a thread means.

Preferably, the connection means comprises two pins which lock grooves provided at the torch main body 1 to form a bayonet mount to engages the whole consumables holder assembly 3 to the torch main body 1. The bayonet mount ensures a high concentric alignment between the consumable holder assembly 3 and the torch main body 1 which prevents any undesirable rotation therebetween, so that all the supplies for coolant, plasma gas, focus gas and shielding gas in the torch main body 1 and the consumables holder assembly 3 can be accurately aligned to each other to allow fluid connection from the proximal end to the distal end of the arc torch.

Preferably, there is an external visual feature 30 on the connection means 12 and the outside of the torch head 2 (not shown) which indicates the orientation of the focus holes 23 at the nozzle 7. When the consumables holder assembly 3 is engaged with the torch head 2 correctly, the visual feature on the connection means 12 and the torch head 2 matches together and shows the direction of the focus holes 23 so that the operator does not have to look down at the focus hole 23 in nozzle 7 to determine the orientation of the arc torch in respect of the travelling direction of welding which makes the replacement of the consumables holder assembly 3 easier and more efficient.

FIG. 4 and FIG. 5 show the main body 4 in a perspective view and a longitudinal view respectively. The main body 4 has a middle section 17 which comprises multiple circumferential grooves (18, 19) having the same axis in the main body 4. The middle section 17 comprises a first groove 18 having a first radial passageway 20 and a second groove 19 having a second radial passageway 21. These two radial passageways extend both radially through the main body 4 which allow a fluid communication between the exterior and the interior of the main body 4. The both radial passageways 20 and 21 are aligned axially.

Moreover, there is an essentially axial groove 24 provided between the first groove 18 and the second groove 19 which allows a fluid communication from the first groove to the second groove, especially from the first radial passageway 20 to the second radial passageway 21. The axial groove 24 is positioned in the opposite of the both radial passageways which enable an efficient cooling of the both grooves (18, 19). In operation, the coolant, e.g. water, flows from the interior of the main body towards the first groove 18 via the first radial passageway 20 and then flows to the second groove 19 via the essentially axial groove 24 and then flows again in the interior of the main body 4 via the second radial passageway 21 in the second groove 19.

Furthermore, the middle section 17 comprises multiple axial passageways at its circumference (not shown) for passing the shielding gas axially from the interior to the exterior of the main body 4 and then through the shielding gas passageway 14 to exit the arc torch. There is no passageway in the main body 4 to pass plasma gas and the electrical power or signals are also not passed through the main body 4. Moreover, the main body 4 comprises two main body pins (29) sitting opposite to each other which correspond to the recesses in the nozzle (7) to engage it to the nozzle (7) to prevent rotational movement between the nozzle (7) and the main body (4).

The main body 4 is made of metallic and plastic material. It is shown in the FIG. 4 that the lower part 25 is made of brass and the upper part 26 is made of PEEK. The lower part accounts preferably for 10% to 30% of the axial length of the main body 4. By having the two different material distributed like so, the main body 4 can resistant the intense heat coming from the arc chamber 10 and maintain a lightweight at the same time in a more cost-effective way.

FIG. 6 shows a longitudinal sectional view of the arc torch after the engagement of the torch main body 1 and the consumables holder assembly 3. The consumables holder assembly 3 comprises a rotational lock which is axially translatable with a spring 27 as compression means. The rotational lock comprises multiple locking pins (28) in the connection means (12) which corresponds to grooves in the main body. When the connection means (12) engages to the main body (4), the pins (28) lock in the grooves and thus prevent a rotation movement therebetween. It provides a set force ensuring repeatable contact of the electrode to the torch.

When the assembled consumable holder assembly 3 is attached to the torch main body 1, the electrode 6 engages the cathode of the torch main body 1 and initiate the contact. As the consumable holder assembly 3 is engaged with the torch main body 1, the inner component comprising main body 4, electrode 6, PGD 8, nozzle 7, shielding cup, SGD stay axially in place, which the connection means keeps moving up through the bayonet mount of the connection means 12 engaging the spring 27 activating a force on the electrode 6. Through the proper design the axial movement compresses the spring 27 through a pre-determined distance which results a pre-defined force on the contact area between the electrode 6 and torch head 2. It ensures the correct contact for both electrical connection and thermal heat transfer from the electrode 6 to the torch main body 1.

The engagement of the consumables holder assembly 3 and the torch main body 1 allows all the fluid communication of the coolant, plasma gas, shielding gas, focus gas to flow from the proximal end to the distal end of the torch.

REFERENCES LIST FOR THE FIGURES

1. torch main body
2. torch head
3. consumables holder assembly
4. main body
5. shielding cup
6. electrode
7. nozzle
8. plasma gas distributor
9. shielding gas distributor
10. arc chamber
11. seat
12. connection means
13. plasma gas passage
14. shielding gas passage
15. orifice
16. shoulder
17. middle section
18. first groove
19. second groove
20. first radial passageway
21. second radial passageway
22. focus gas passageway
23. focus hole
24. axial groove
25. metal
26. plastic
27. compression member
28. locking pin
29. main body pin
30. external visual feature

The invention claimed is:

1. A consumables holder assembly for a plasma arc torch having a torch head, the consumables holder assembly comprising, a main body, a shielding cup which engages the main body, a connection means which engages the main body to the torch head, and consumable components comprising an electrode, a nozzle, a plasma gas distributor, and a shielding gas distributor, which are all positioned inside the shielding cup, wherein the consumable holder assembly is detachable from the torch head together with the consumable components and the shielding cup as one unit, and wherein the nozzle comprises two focus gas passageways which lead a focus gas out of the nozzle through at least two focus holes, and the consumables holder assembly further comprising a rotational lock between the main body and the connection means, and orientation means for providing angular localization of the consumable holder assembly and the torch head, wherein the connection means comprises a mechanical attachment mechanism which engages the connection means to the torch head and wherein a compression member is provided between the connection means and the main body which allows the connection means to keep moving proximally via the mechanical attachment mechanism and activates a force on the electrode when the electrode engages the torch head and the remainder of the consumables holder assembly stay axially in place.

2. The consumables holder assembly according to claim 1, wherein the orientation means is a bayonet mount in the connection means which is engageable with the torch head and ensures the focus holes are correctly orientated angularly to the torch head.

3. The consumables holder assembly according to claim 1, wherein the consumables holder assembly comprises a compression member between the main body and the connection means, wherein the rotational lock is axially translatable with the compression member.

4. The consumables holder assembly according to claim 1, wherein the compression member is a spring and the rotational lock comprises at least one locking pin in the connection means which prevent a rotational movement by inserting them in grooves of the main body.

5. The consumables holder assembly according to claim 4, wherein the rotational lock comprises multiple locking pins.

6. The consumables holder assembly according to claim 1, wherein one or more main body pins are provided at the distal end of the main body and are engageable with the nozzle.

7. The consumables holder assembly according to claim 6, wherein a plurality of the main body pins are provided and are positioned equally spaced from one another.

8. The consumables holder assembly according to claim 6, wherein a plurality of the main body pins are provided.

9. The consumables holder assembly according to claim 1, wherein the two focus holes are situated in the nozzle perpendicular to a welding direction.

10. The consumables holder assembly according to claim 1, wherein the main body is made of metallic and insulative material.

11. The consumables holder assembly according to claim 10, wherein the metallic material is positioned in the 10% to 30% of an axial length of the main body and the remainder of the main body is made of insulative material.

12. The consumables holder assembly according to claim 1, wherein the main body has a middle section comprising at least two circumferential grooves having the same axis in the main body, wherein a first groove comprises a first radial passageway and a second groove comprises a second radial passageway, wherein the first radial passageway and the second radial passageway each extend through the main body and allow fluid communication between an exterior and an interior of the main body, and wherein an axial passageway is provided between the first groove to the second groove which allows an axial fluid communication from the first groove to the second groove.

13. The consumables holder assembly according to the claim 12, wherein the first radial passageway and the second radial passageway are aligned axially and the axial passageway is positioned in the opposite of both said first and second radial passageways.

14. The consumables holder assembly according to claim 1, wherein the main body further comprises multiple axial passageways for passing a shielding gas from the interior to the exterior of the main body.

15. A plasma arc torch comprising an arc main body having a torch head and a consumables holder assembly according to claim 1.

16. A method of welding comprising welding using a plasma arc torch according to claim 15.

17. The consumables holder assembly according to claim 1, wherein the orientation means is a bayonet mount in the connection means which is engageable with the torch head and ensures the focus holes are correctly orientated angularly to the torch head, wherein the bayonet mount includes the pins that are fully engaged to an end of a groove in the torch head.

18. The consumables holder assembly according to claim 1, wherein the main body is made of brass and polyether ether ketone.

* * * * *